US009829328B2

(12) United States Patent
Kawamukai

(10) Patent No.: US 9,829,328 B2
(45) Date of Patent: Nov. 28, 2017

(54) METHOD AND APPARATUS FOR ROUTE CALCULATION INVOLVING FREEWAY JUNCTION

(71) Applicant: Alpine Electronics, Inc., Tokyo (JP)

(72) Inventor: Hideo Kawamukai, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 135 days.

(21) Appl. No.: 14/834,051

(22) Filed: Aug. 24, 2015

(65) Prior Publication Data

US 2017/0059351 A1   Mar. 2, 2017

(51) Int. Cl.
  *G01C 21/20* (2006.01)
  *G01C 21/34* (2006.01)
  *G01C 21/36* (2006.01)

(52) U.S. Cl.
  CPC ......... *G01C 21/3461* (2013.01); *G01C 21/20* (2013.01); *G01C 21/3415* (2013.01); *G01C 21/3676* (2013.01)

(58) Field of Classification Search
  None
  See application file for complete search history.

(56) References Cited

U.S. PATENT DOCUMENTS

| 5,712,788 | A * | 1/1998 | Liaw | G01C 21/3446 340/990 |
| 8,055,443 | B1 * | 11/2011 | Uyeki | G01C 21/3415 340/995.13 |
| 2004/0042405 | A1 * | 3/2004 | Nesbitt | G01C 21/3446 370/238 |
| 2010/0217512 | A1 * | 8/2010 | Vu | G01C 21/3461 701/532 |
| 2011/0137552 | A1 * | 6/2011 | Chang | G01C 21/3415 701/533 |
| 2014/0343853 | A1 * | 11/2014 | Ebina | G01C 21/3415 701/541 |
| 2017/0038941 | A1 * | 2/2017 | Pylappan | G06F 3/04815 |

FOREIGN PATENT DOCUMENTS

JP   2009-150821   7/2009

* cited by examiner

*Primary Examiner* — Thomas G Black
*Assistant Examiner* — Demetra Smith-Stewart
(74) *Attorney, Agent, or Firm* — Muramatsu & Associates

(57) ABSTRACT

A method and apparatus of calculating a route involving a freeway junction determines an undesired freeway junction that can pose a driving difficulty, and performs route recalculation that avoids the undesired freeway junction. A distance from a freeway entry to a freeway junction, or a number of freeway entries up to the freeway junction are used to determine the undesired freeway junction. A distance from the freeway junction to a freeway exit is also used to determine the undesired freeway junction. An intermediate point is set to recalculate a route that does not involve the freeway junction to create an overall route.

20 Claims, 14 Drawing Sheets

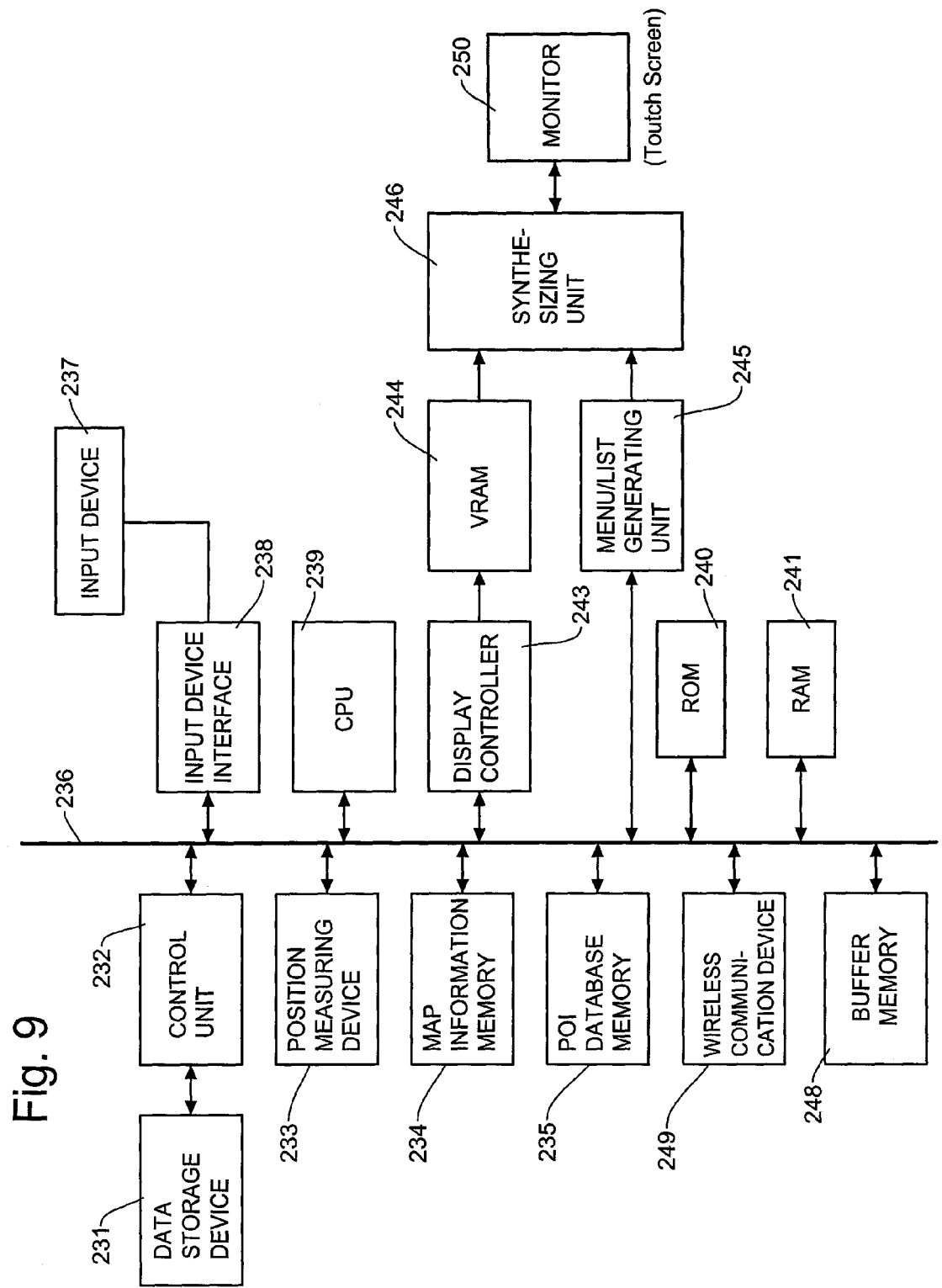

METHOD AND APPARATUS FOR ROUTE CALCULATION INVOLVING FREEWAY JUNCTION

FIELD OF THE INVENTION

This invention relates to a method and apparatus for calculating a route to a destination for a navigation system. More particularly, this invention relates to a method and apparatus for calculating a route to a destination involving a freeway and a freeway junction by determining whether a particular freeway junction may pose a difficulty to a driver and recalculating an alternative route that can avoid such a freeway junction.

BACKGROUND OF THE INVENTION

A navigation system performs travel guidance for enabling a user to easily and quickly reach the selected destination. For example, a vehicle navigation system guides a user (driver) of a vehicle to a destination through a calculated route. Such a navigation system detects a current position of the user's vehicle via a GPS (Global Positioning System) and calculates an optimum route to a destination specified by the user based on map data retrieved from a data storage medium, for example, a DVD (digital versatile disc), a semiconductor memory drive, or a hard disc.

Typically, the navigation system displays a map image on a monitor screen while superimposing thereon a mark representing the current location of the user' vehicle. At each intersection on the calculated route, the navigation system notifies the user which direction to turn. During such route guidance, in addition to GPS, the navigation system also performs dead reckoning and map matching technology with use of distance data from sensors attached to the vehicle, a gyroscope and accelerometers to improve reliability of the route guidance system.

A conventional navigation system uses a path finding algorithm to calculate a route between a start point (current position) to a destination. The path finding algorithm of a navigation system considers an overall cost, for example, a distance and a time to reach the destination. When there is a suitable freeway that may be used to reach the destination, such a freeway may be preferentially selected in a calculated route because of its low cost. Namely, freeways have a higher speed limit and do not have traffic lights or stop signs that slow down the vehicle so that the vehicle can reach the destination with a short time, i.e., with a low cost.

Typically, the cost is associated with a distance, road type, speed limit, left/right turn maneuver, entry/exit of a freeway, etc., and is used to calculate a desired route to the destination. When an entry to a freeway exists near a start point, the path finding algorithm often produces a calculated route that promptly enters the freeway entry since the vehicle can reach the destination in a shorter time. However, such a route may require the driver to encounter a freeway junction and to make a complex maneuver soon after the entry to the freeway. A traffic maneuver at a freeway junction can be stressful even for an experienced driver, especially when a maneuver is required soon after entering the freeway. Thus, it is desirable that the navigation system offers a route that is easy for a driver to follow.

SUMMARY OF THE INVENTION

It is, therefore, an object of the present invention to provide a method and apparatus for calculating a route to a destination involving a freeway junction by determining whether a particular freeway junction may pose a difficulty or rush feeling to a driver and recalculating an alternative route that can avoid such a freeway junction.

It is another object of the present invention to provide a method and apparatus for calculating a route to a destination involving a freeway junction by detecting the undesired condition based on a number of entries to the freeway compared with a predetermined threshold number.

It is a further object of the present invention to provide a method and apparatus for calculating a route to a destination involving a freeway junction by detecting the undesired condition based on a distance between an entry to the freeway and the freeway junction with a predetermined threshold number.

It is a further object of the present invention to provide a method and apparatus for calculating a route to a destination involving a freeway junction by detecting the undesired condition based on a distance between the freeway junction and an exit from the freeway with a predetermined threshold number.

One aspect of the present invention is a method of route calculation for a navigation system. The method includes the following steps of: establishing, by using a processor, a calculated route between a start point and a destination by evaluating map data of a navigation system where the calculated route includes a freeway; examining the calculated route to detect whether there is a freeway junction, where the freeway junction is defined as a route to allow a vehicle to change from one freeway to another freeway; examining the calculated route to detect a location of an entry to the freeway or an exit from the freeway proximate to the freeway junction; further examining the calculated route to detect whether there is an undesired condition related to the freeway junction, entry to the freeway or exit from the freeway that may require prompt driving maneuvers of the vehicle by a driver; and recalculating, when the undesired condition is detected, a route between the start point and the destination so that the recalculated route avoids the freeway junction related to the undesired condition.

In a preferred embodiment, the step of examining the calculated route to detect the undesired condition is conducted by comparing a number of entries to the freeway with a predetermined threshold number where the number of entries to the freeway is counted between the first entry to the freeway and the freeway junction.

In a preferred embodiment, the step of examining the calculated route to detect the undesired condition is conducted by comparing a distance between an entry to the freeway and the freeway junction with a predetermined threshold distance or comparing a distance between an exit from the freeway and the freeway junction with another predetermined threshold distance.

Another aspect of the present disclosure is directed to an apparatus of route calculation for a navigation system. The route calculation apparatus is configured by a storage device, an input device, a monitor screen, a CPU, etc. where the CPU implements the operations of the route calculation method described above.

According to the method and apparatus for calculating a route involving a freeway junction, the present invention can detect an undesired freeway junction and recalculate to create an alternative route that does not have the undesired freeway junction. The method and apparatus detects the undesired condition based on a number of entries to the freeway compared with a predetermined threshold number.

Alternatively, the method and apparatus detects the undesired condition based on a distance between an entry to the freeway and the freeway junction with a predetermined threshold number. Similarly, the method and apparatus detects the undesired condition based on a distance between the freeway junction and an exit from the freeway with a predetermined threshold number. Consequently, the recalculated route is able to avoid the freeway junction thereby relieving the driver from the stressful and difficult driving maneuvers such as quick lane changes, etc.

BRIEF DESCRIPTION OF THE DRAWINGS

FIG. 1A shows freeways, a start point and a freeway junction, FIG. 1B shows a route to the destination calculated by a conventional method in the situation of FIG. 1A, and FIG. 1C shows a route to the destination calculated by the present invention for the situation of FIG. 1A.

FIG. 2A shows an example to determine whether a freeway junction should be avoided based on a number of ramps to a freeway, and FIG. 2B shows an example to determine whether a freeway junction should be avoided based on a distance between an entry ramp and a freeway junction.

FIG. 3A shows the process which evaluates the number entries directed to the situation of FIG. 2A, FIG. 3B shows the process which evaluates the distance directed to the situation of FIG. 2B, and FIG. 3C shows the process which evaluates total costs without assigning costs to difference in road class.

FIG. 4A shows freeways, a destination and a freeway junction, FIG. 4B shows a route to the destination calculated by a conventional method in the situation of FIG. 4A, and FIG. 4C shows a route to the destination calculated by the present invention for the situation of FIG. 4A.

FIG. 6A shows the process which evaluates the distance directed to the situation of FIG. 5, and FIG. 6B shows the process which evaluates total costs without assigning costs to difference in road class.

FIG. 9 is a functional block diagram showing an example of structure of a vehicle navigation system implementing the route calculation method of the present invention involving a freeway junction.

DETAILED DESCRIPTION OF THE PREFERRED EMBODIMENT

The present invention will be described in detail with reference to the accompanying drawings. The method and apparatus of the present invention for route calculation involving a freeway junction may be advantageously implemented to a vehicle navigation system. Further, the method and apparatus of the present for route calculation involving a freeway junction may also be implemented to a smartphone carried by a user of a vehicle. Moreover, any other devices having GPS (Global Positioning System) capabilities that are mountable to a vehicle may also advantageously incorporate the present invention.

When a user specifies a destination, a navigation system returns a calculated route between a start point and the destination by evaluating various costs such as a distance, time, road conditions, etc. When there is a freeway that may be used to reach the destination, such a freeway may be preferentially selected in a calculated route because the user can reach the destination in a shorter time. However, such a calculated route is not always a desirable one depending on the situation of freeway junctions.

Figure 1A:
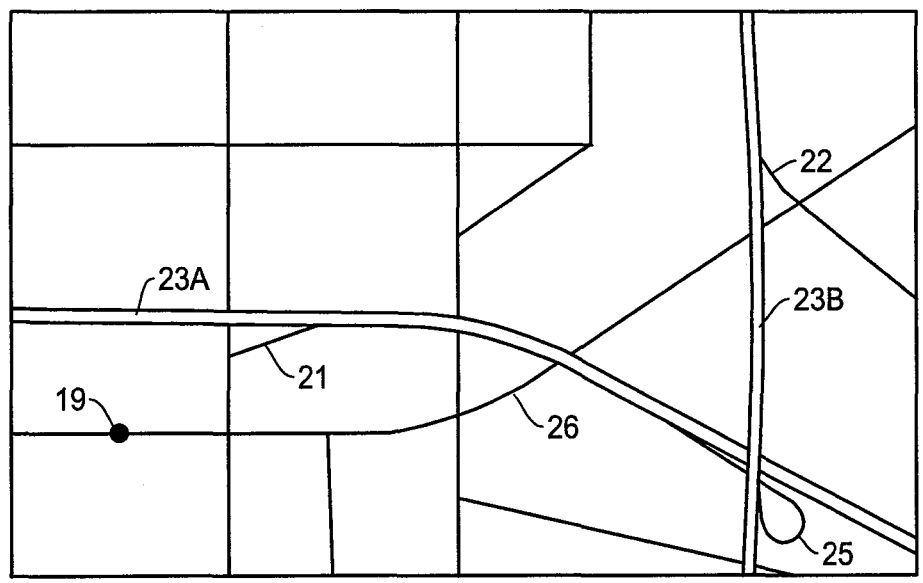
FIGS. 1A-1C are schematic diagrams showing map views including freeways and freeway junctions, where

Such a situation involving a freeway junction where a navigation system may return an undesirable route is described with reference to FIGS. 1A and 1B. FIG. 1A is a map view that shows a freeway 23A (first freeway) that runs East-West (horizontal) direction and a freeway 23B (second freeway) that runs North-South (vertical) direction. Within the context of the present invention related to FIGS. 1A and 1B, it is assumed that, to reach the destination, the freeway 23B is preferable in the calculated route. A freeway junction 25 (interchange) allows a vehicle to change the freeway from freeway 23A to freeway 23B or vice versa. Fur this purpose, a freeway junction is provided at a location where multiple freeways intersect with one another. The map view of FIG. 1A further shows a start point 19 on a surface street 26, a ramp (entry) 21 connected to the freeway 23A and a ramp (entry) 22 connected to the freeway 23B.

Figure 1B:

FIG. 1B is a map view showing an example of route from the start point 19 on the surface street 26 to a destination (not shown) calculated by a conventional navigation method under the situation shown in FIG. 1A, where the calculated route is represented by a thick line on the map image. In this situation, the calculated route from the start point 19 leaves the surface street 26 and immediately takes the ramp 21 to enter the freeway 23A to drive to the east (right) since a navigation system usually recommends to take freeways as soon as possible. Then the calculated route takes the freeway junction 25 to enter the freeway 23B to drive to the north (upward).

In this manner, in a conventional route calculation method, a navigation system attempts to use a freeway which generally has a lower cost than other roads for route calculation purposes. As a result, the navigation system produces a calculated route that includes the ramp 21 which is closest to the start point 19 to enter the (first) freeway 23A. As noted above, it is assumed that, to reach the destination, the (second) freeway 23B is preferable in the calculated route. In this calculated route, soon after taking the freeway 23A, the driver will encounter the freeway junction 25 so that the driver is able to take the freeway 23B. However, making such lane changes to prepare for the freeway junction 25 soon after entering the freeway 23A can be difficult and stressful to the driver.

Figure 1C:
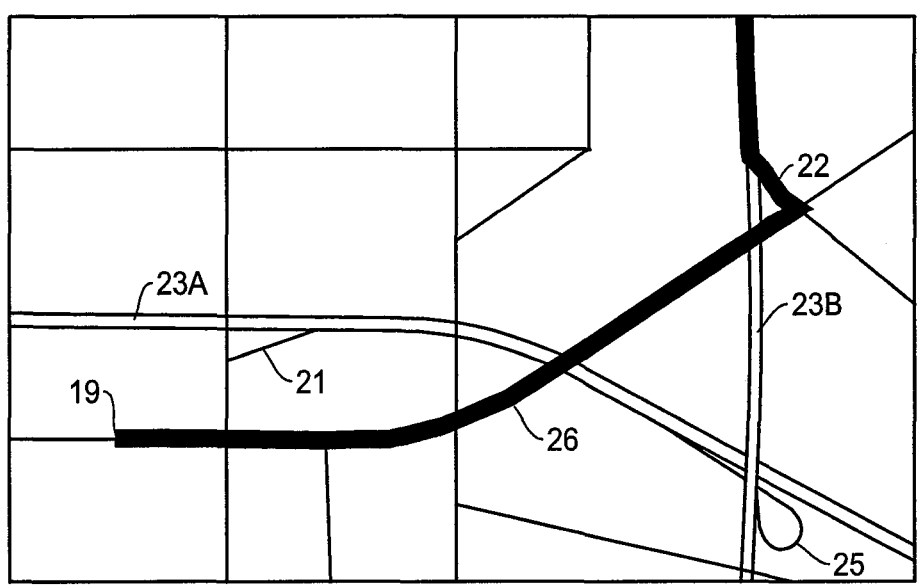

FIG. 1C is a map view showing an example of route to the destination calculated by the method and apparatus proposed by the present invention under the situation shown in FIG. 1A. Compared to the route obtained by the conventional route calculation shown in FIG. 1B, the route represented by a thick line on the roads in FIG. 1C takes the surface street 26 rather than immediately entering the first freeway 23A via the ramp 21. Specifically, from the start point 19, the route stays on the surface street 26 until the ramp 22 (entry) located away from the freeway junction 25 to enter the second freeway 23B. In FIG. 1C, since the freeway junction 25 is avoided in the calculated route, it is unnecessary for the driver to perform the complicated maneuvers such as immediate lane changes, etc.

Figure 2A:
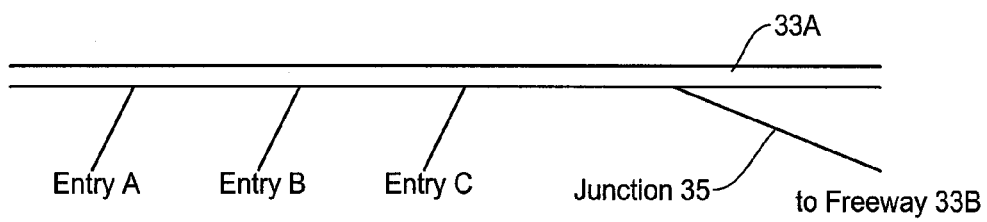
FIGS. 2A and 2B are diagrams showing route calculation operations under the present embodiments to determine whether there exist undesirable freeway junction situations, where
Figure 2B:
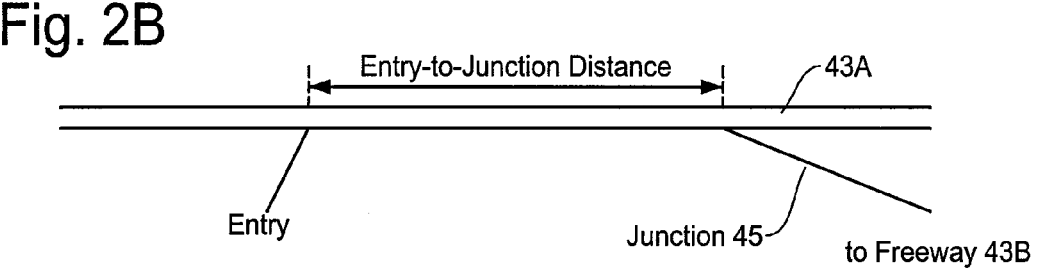

Examples of method to calculate the route shown in FIG. 1C, which avoids the freeway junction 25, are described in more detail with reference to the drawings. FIGS. 2A and 2B are diagrams showing route calculation operations under the present invention to determine whether there exists an undesirable freeway junction situation. FIG. 2A shows an example in which the route calculation operation determines whether a freeway junction should be avoided based on a number of ramps (entries). FIG. 2B shows an example in which the route calculation operation determines whether a freeway junction should be avoided based on a distance between a ramp (entry) and the freeway junction.

The example of FIG. 2A shows a freeway 33A, three entry (ramps) A, B and C, and a freeway junction 35 connected to the freeway 33A (first freeway) to change to another freeway 33B (second freeway). In this method of FIG. 2A, the route calculation operation determines whether the freeway junction 35 should be avoided from the calculated route based on a number of entry ramps. If it is determined that the freeway junction 35 should be avoided by recalculation, a newly calculated route under the present invention excludes the freeway junction 35 and also the freeway 33A so that the vehicle does not have to use the freeway junction 35. Accordingly, similar to the route shown in FIG. 1C, the route calculation method of the present invention produces a calculated route in which the vehicle can enter the second freeway 33B at an entry ramp provided beyond the freeway junction 35.

Figure 3A:
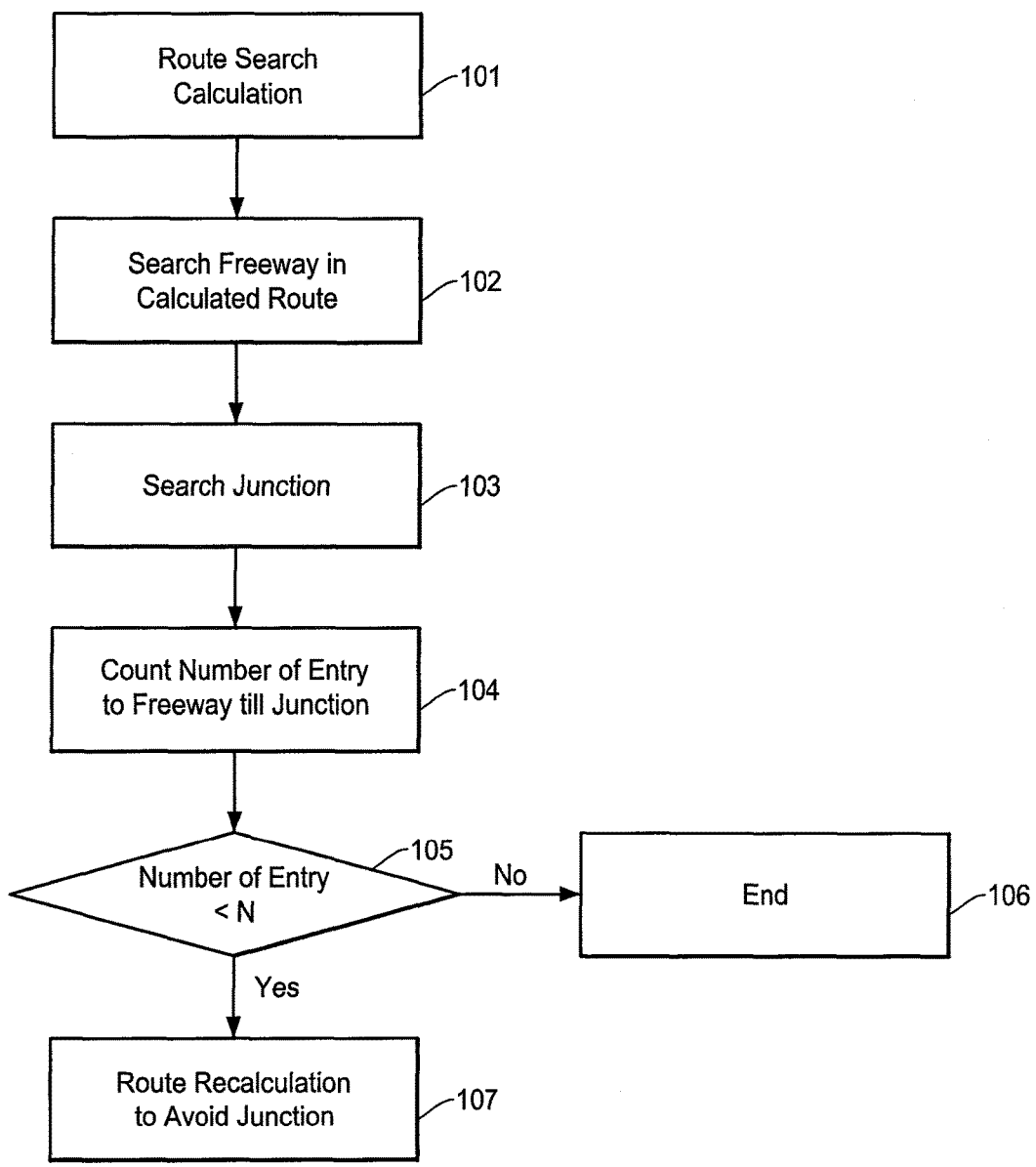
FIGS. 3A-3C are flow charts showing operational steps of route calculation under the present invention to determine whether a particular freeway junction should be avoided, where

The flow chart of FIG. 3A shows operational steps for determining whether a freeway junction in the originally calculated route should be avoided and obtaining a favorable calculated route excluding the freeway junction for the conditions shown in FIG. 2A. In FIG. 3A, at step 101, the navigation system calculates a route from a start point to a destination with reference to the map data typically stored in a map database (storage device) of the navigation system. The start point may be a current position of the vehicle or an arbitrarily-set position specified by the user. As known in the art, the route calculation process may utilize any search algorithm, such as A* Algorithm, incremental heuristic search algorithms, Dijkstra's Algorithm, or combination of the above algorithms while evaluating various costs. The originally calculated route in this stage can be a temporary one that may be recalculated in case where a freeway junction that should be avoided is involved as described below.

In step 102, the navigation system determines if a freeway is involved in the calculated route. The determination of whether a freeway is involved can be made by checking road link attributes in the map data. The road link attribute may indicate that the particular road link is a freeway, highway, pay road, surface street etc. and may also indicate a speed limit of the road. In this process, the navigation system will read the link data in the calculated route stored in the map database by traversing the calculated route beginning from the start point, and checks the link type (road link attribute) of each link data. If the link type is a freeway, the navigation system determines that a freeway is involved in the calculated route.

When a freeway is determined to be involved in the calculated route, the process moves to step 103 in which the navigation system will determine if the calculated route involves a freeway junction. As noted above, a freeway junction is provided at a location where multiple freeways intersect with one another to allow a vehicle to change one freeway to another freeway. Specifically, the navigation system will read the link data of the calculated route stored in the map database or other memory device by traversing the calculated route after entry to the freeway, and checks the link type of each link data. If the link type is a freeway junction, the navigation system determines that a freeway junction is involved in the calculated route.

Then, in step 104, the navigation system will count a number of freeway entries from the first entry to the last entry before the freeway junction. Referring to the schematic view of FIG. 2A, entry A, entry B, entry C and freeway junction 35 are connected to the (first) freeway 33A where the freeway junction 35 allows the vehicle to enter the (second) freeway 33B. Suppose the calculated route is configured to enter the freeway 33A through the entry A and exit the freeway 33A via the freeway junction 35 to enter the freeway 33B, the number of other freeway entries to the freeway 33A from the entry A to the freeway junction is two (2), i.e., entry B and entry C. However, such a specific way of counting the number of entries is insignificant, and thus, other way of counting the number can also be used.

In step 105, the navigation system compares the number of entries to the freeway before encountering the freeway junction (before-junction entry number) with a predetermined threshold number N. The predetermined number N of freeway entries is set so as to avoid prompt maneuver (ex. change lane) of a vehicle to a freeway junction after entering the freeway. When the threshold number N is large, a driver is able to avoid prompt maneuver of a vehicle since he/she has a sufficient time to reach the freeway junction. In this embodiment example, the number N is set to three (3). The number N is not limited to three, but can be any number that is appropriate to avoid the prompt maneuver by a driver to reach a freeway junction to enter another freeway.

When the before-junction entry number is less than N, it means that the calculated route requires the driver to perform prompt maneuver of vehicle. Thus, the process moves to step 107 where the navigation system recalculates to find a route that can avoid the freeway junction. As a result, in the case of FIG. 2A, the recalculated route can be a one that avoids the freeway 33A as well as the freeway junction and enters the freeway 33B at a location beyond the freeway junction 35.

On the other hand, when the before-junction entry number is equal to or greater than N, this means that there is a sufficient time and thus prompt maneuver is unnecessary to enter the freeway junction. Thus, the process moves to step 106 where the navigation system terminates the procedure so that the calculated route produced in step 101 will be employed as a final route. Namely, the calculated route can be a one that enters the freeway 33A via the entry A and takes the freeway junction 35 to proceed to the freeway 33B.

Figure 7:
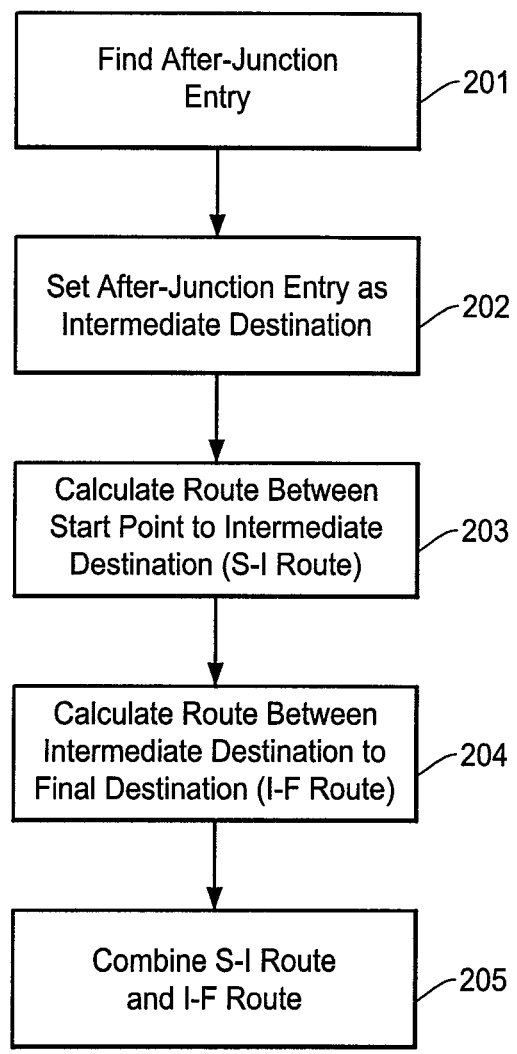
FIG. 7 is a flow chart showing detailed steps of a sub-routine respectively indicated by step 107 of FIG. 3A and step 117 of FIG. 3B for recalculating a route after an undesired freeway junction has been identified soon after entering a freeway.

The flow chart of FIG. 7 shows detailed procedures of step 107 in FIG. 3A where the navigation system recalculates a route that is able to avoid the freeway junction. In step 201, the navigation system finds an after junction entry where the after junction entry is an entry (ramp) to a second freeway that comes first after passing the freeway junction. In the example shown in FIGS. 1A to 1C, the ramp 22 connected to the freeway 23B is the after-junction entry since this ramp 22 is the first entry to the second freeway 23B after the freeway junction 25.

In step 202, the after-junction entry is set as an intermediate destination in the navigation system. The intermediate destination may be set in the navigation system by selecting a link of the ramp 22 (after-junction entry) from the map data. Alternatively, the intermediate destination may be set in the navigation system by selecting a node or vertex of the link of the ramp 22 (after-junction entry) from the map data.

In step 203, the navigation system calculates to find a route between the start point (S) to the intermediate destination (I), where this route may also be referred to as "S-I route" hereafter. In the above example, the intermediate destination (I) is the ramp 22 which is the first entry to the second freeway 23B after the freeway junction 25. Any path finding algorithm may be utilized in calculating the route between the start point to the intermediate destination to determine the S-I route.

Next, in step 204, the navigation system calculates to find a route between the intermediate destination (I) to the final destination (F), where this route may also be referred to as "I-F route" hereafter. In calculating the I-F route, the navigation system may simply retrieve the overall route previously calculated in step 101 of FIG. 3A and make use of the route between the ramp 22 and the final destination. Finally, the navigation system combines the S-I route and the I-F route to obtain a full route from the start point (S) to the final destination (F).

In the example described above, the route calculation method determines whether the route should be recalculated to avoid a freeway junction based a number of entries (ramps) before the freeway junction. Another method of determining whether the navigation system should perform route recalculation to avoid a freeway junction in the manner shown in FIG. 1C is described with reference to FIG. 2B, FIG. 3B and FIG. 7. Once it is determined that the route to the destination should be recalculated to avoid the freeway junction, such a recalculation process is the same as that described above with reference to the flow chart of FIG. 7, and thus, descriptions of which will be omitted.

The schematic view of FIG. 2B shows a freeway 43A, an entry to the freeway 43A and a freeway junction 45 connected between the freeway 43A (first freeway) and another freeway 43B (second freeway). In this example, the navigation system evaluates an originally calculated route and determines whether a freeway junction should be avoided based on a distance between a ramp (entry) and the freeway junction. If it is determined that the freeway junction 35 should be avoided by recalculation, such a recalculated route under the present invention excludes the freeway junction 45 and also the freeway 43A so that the vehicle does not have to use the freeway junction 45. Accordingly, similar to the route shown in FIG. 1C, the route calculation method of the present invention produces a newly calculated route (recalculated route) in which the vehicle can enter the second freeway 433 at an entry ramp provided beyond the freeway junction 45.

Figure 3B:
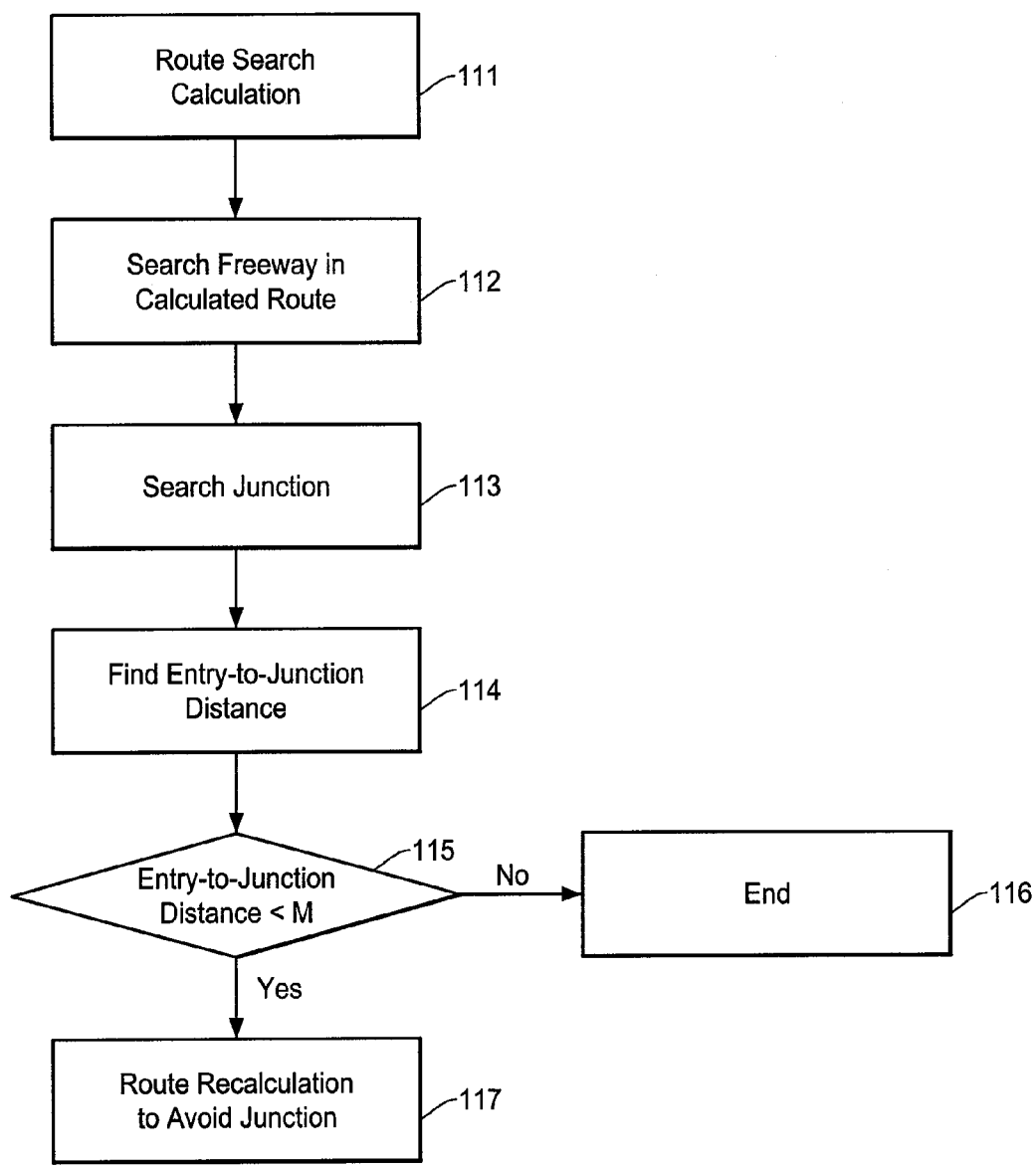

The flow chart of FIG. 3B shows operational steps for determining whether a freeway junction in the originally calculated route should be avoided and obtaining a favorable calculated route excluding the freeway junction for the conditions shown in FIG. 2B. In FIG. 3B, at step 111, the navigation system calculates a route from a start point to a destination in the similar manner as step 101 of FIG. 3A described above. The start point may be a current position of the vehicle or an arbitrarily-set position specified by the user. The originally calculated route in this stage can be a temporary one that may be recalculated in case where a freeway junction that should be avoided is involved as described below.

In step 112, the navigation system determines if a freeway is involved in the calculated route. The determination of whether a freeway is involved can be made by checking road link attributes in the map data. In this process, the navigation system will read the link data in the calculated route stored in the map database by traversing the calculated route beginning from the start point, and checks the link type (road link attribute) of each link data. If the link type is a freeway, the navigation system determines that a freeway is involved in the calculated route.

When a freeway is determined to be involved in the calculated route, the process moves to step 113 in which the navigation system will determine if the calculated route involves a freeway junction. As noted above, a freeway junction is provided at a location where multiple freeways intersect with one another to allow a vehicle to change the freeway to another freeway. Specifically, the navigation system will read the link data of the calculated route stored in the map database or other memory device by traversing the calculated route after entry to the freeway, and checks the link type of each link data. If the link type is a freeway junction, the navigation system determines that a freeway junction is involved in the calculated route.

When a freeway junction is involved in the calculated route, in step 114, the navigation system will determine a distance between the first entry to the freeway and the freeway junction. In the schematic view of FIG. 2B, the distance between the entry and the junction is represented by "the entry-to-junction distance". As can be seen in the situation of FIG. 2B, the shorter the entry-to-junction distance, the sooner it becomes the driver encounters the freeway junction 45 after entering the freeway 43A (first freeway). Thus, when the entry-to-junction distance is short and the calculated route requires to proceed to the freeway 43B (second freeway), the driver of the vehicle has to quickly look the surroundings and change the lane or to conduct other maneuvers to take the freeway junction 45 which may be difficult and stressful to the driver.

In step 115, the navigation system evaluates the entry-to-junction distance by comparing with a predetermined threshold distance M. The predetermined distance M is set as a reference to avoid prompt maneuver to reach the freeway junction after entry to the first freeway. For example, the predetermined distance M is set to 0.5 mile although the predetermined threshold distance M can be any distance that can detect an allowable distance before reaching the freeway junction after the entry of the first freeway.

When the entry-to-junction distance is less than the predetermined distance M, since this means that the calculated route requires the prompt maneuver of the vehicle, the process moves to step 117. Thus, the navigation system recalculates to find a newly calculated route that can avoid the free junction. In step 117, the procedures shown in FIG. 7 are executed in the manner described above.

On the other hand, if the entry-to-junction distance is greater than M, since this means that the driver has a sufficient time for maneuvering the vehicle, the process moves to step 116 where the navigation system terminates the procedure so that the calculated route produced in step 111 will be employed as a final one. Namely, the calculated route can be a one that enters the freeway 43A via the entry and takes the freeway junction 45 to proceed to the freeway 43B in the example of FIG. 2B.

Figure 3C:
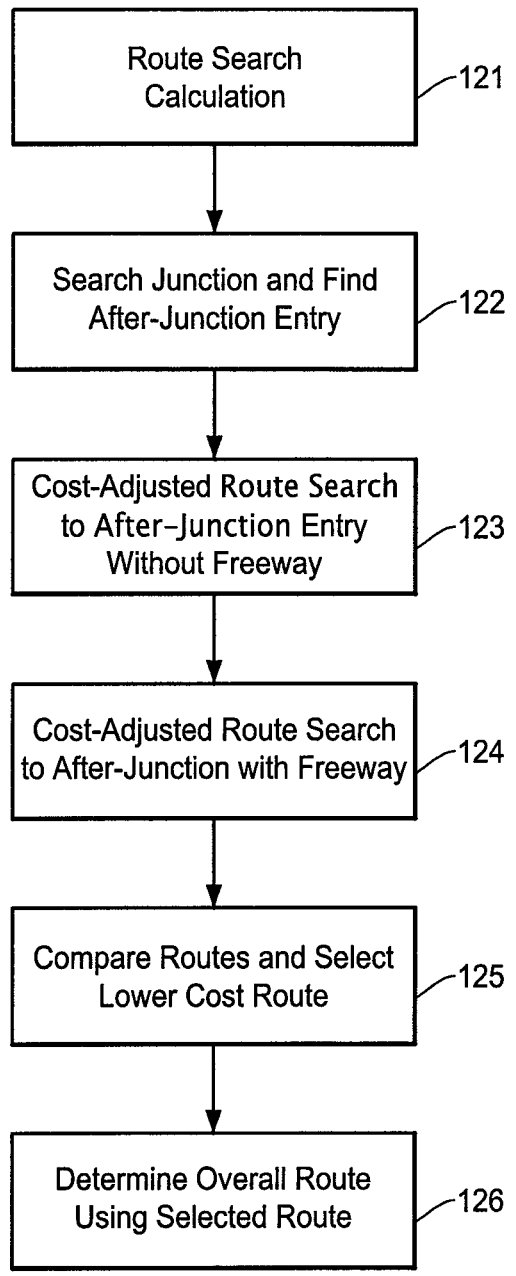

Still another method to calculate the route shown in FIG. 1C, which avoids an entry to a first freeway or an encounter with a freeway junction, is described with reference to the flow chart in FIG. 3C. In this method, when a freeway junction is involved in an originally calculated route, a route between a start point and a first entry (ramp 22 in FIG. 1C) of a second freeway (freeway 23B) will be recalculated without assigning a lower cost to a first freeway (freeway 23A). Since the lower cost of freeway is not considered, it becomes less likely that the first freeway and thus the freeway junction will be included in the recalculated route.

In step 121, the navigation system calculates a route from a start point to a destination similar to the step 101 of FIG. 3A and step 111 of FIG. 33. The start point may be a current position of the vehicle or an arbitrarily-set position entered by the user. It should be noted that the step 102 in FIG. 3A or the step 112 in FIG. 3B to determined whether a freeway is included in the calculated route is not shown in FIG. 3C although this process can be conducted simultaneously with the step 121, the following step 122, or independently.

In step 122, the navigation system determines whether a freeway junction exists in the calculated route and if so, finds a location of an after-junction entry in the calculated route. The after-junction entry is an entry to a second freeway, i.e., freeway 23B in FIG. 1C that comes first after the freeway junction 25. The navigation system may find the freeway junction and the after-junction entry after completing the initial route search, or it may simultaneously search the freeway junction and the after-junction entry as the initial route search is being performed.

In step 123, the navigation system performs a route search between the start point and the after-junction entry without using a freeway. In this process, the navigation system ignores the freeway links in calculating the route so that the first freeway 23A is not included in a resultant route. In step 124, the navigation system performs a route search between the start point and the after-junction entry without excluding a freeway so that the first freeway 23A can be included in a resultant route.

Unlike the conventional route search, in both step 123 and step 124, the navigation system disregards the cost relating to road link type (freeway, surface road, etc.) that is associated with the link of the route. In general, a freeway link is assigned a lower cost compared to a surface road link, thus a freeway is more likely selected in a calculated route because of its low cost. However, by equalizing the cost between the freeway link and the surface road link, the navigation system will not preferentially select a freeway in a calculated route.

In step 125, the route obtained in step 123 without allowing a freeway and the route obtained in step 124 allowing a freeway are compared, and the route with lower cost is selected. Since the cost of the freeway is the same as the cost of surface roads in the evaluation of step 124, the route found in step 123 tends to be lower in cost than the route found in step 124. This is because, to take a freeway, additional roads and ramps have to be typically included in the route, which increases an overall cost.

In step 126, the navigation system determines an overall route from the start point to the destination including the route selected in step 125. As noted above, the route selected in step 125 runs between the start point and the after-junction entry (ramp 22 in FIG. 1C). Thus, in the process of step 126, the navigation system combines the selected route between the start point and the after-junction entry and the remaining route between the after-junction entry and the destination, thereby establishing an overall route without an undesired freeway and freeway junction (freeway 23A and junction 25 in FIG. 1C).

The above examples are directed to the situation where the calculated route involves a freeway junction that is encountered soon after entry to a freeway. Another situation where the technology of the present invention can be implemented is a situation where a route reaches an exit ramp to the destination soon after a freeway junction. In this situation, it is assumed that the calculated route is already on a freeway and approaching a freeway junction to change to another freeway to reach the exit ramp.

Figure 4A:
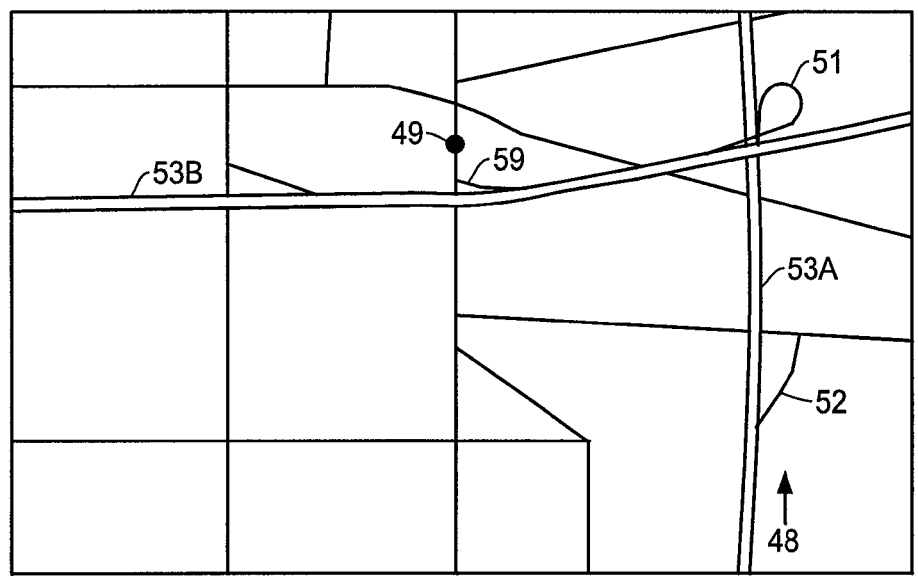
FIGS. 4A-4C are schematic diagrams showing map views including freeways and freeway junctions, where

FIG. 4A is a map view showing a first freeway 53A that runs North-South (vertical) direction and a second freeway 53B that runs East-West (horizontal) direction. A freeway junction 51 (interchange) allows a vehicle to move between the freeway 53A and the freeway 53B. Thus, a freeway junction is provided at a location where multiple freeways intersect with one another. The map view of FIG. 4A further includes an arrow 48 showing a direction of travel, a destination 49, a ramp (exit) 52 connected to the freeway 53A, and a ramp (exit) 59 connected to the freeway 53B.

Figure 4B:
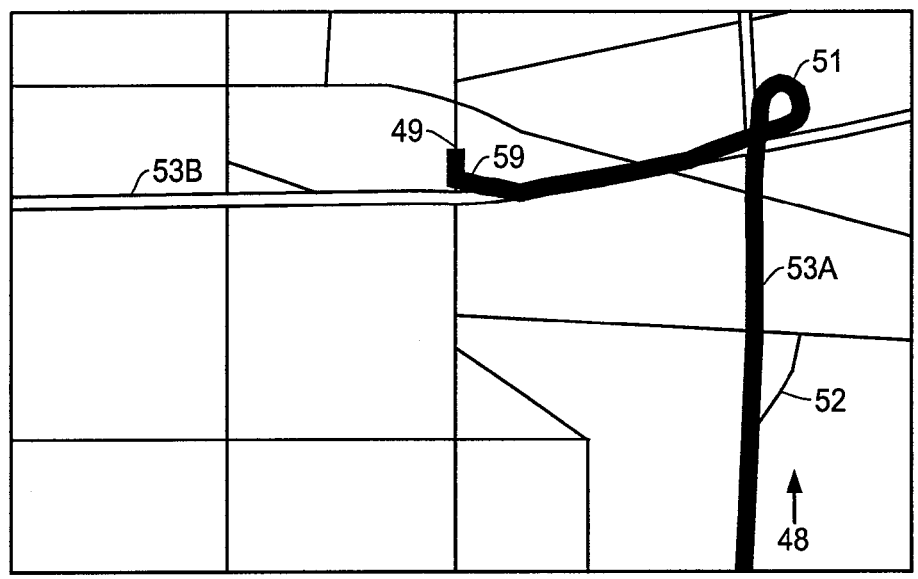

FIG. 4B is a map view showing a calculated route obtained by applying a route search by a conventional technology for the situation of FIG. 4A. In FIG. 4B, the resultant calculated route is represented by a thick line on the map image. The calculated route runs along the first freeway 53A from the south as indicated by the arrow 48, takes the freeway junction 51 to enter the second freeway 53B, takes the ramp 59 to exit the second freeway 53B, and reaches the destination 49 after exiting the second freeway 53B. In this route, however, the driving maneuvers to take the freeway junction 51 and promptly exit the freeway 53B via the ramp 59 can be difficult and stressful to the driver especially when the traffic is congested because the driver has to change the lanes quickly.

Figure 4C:
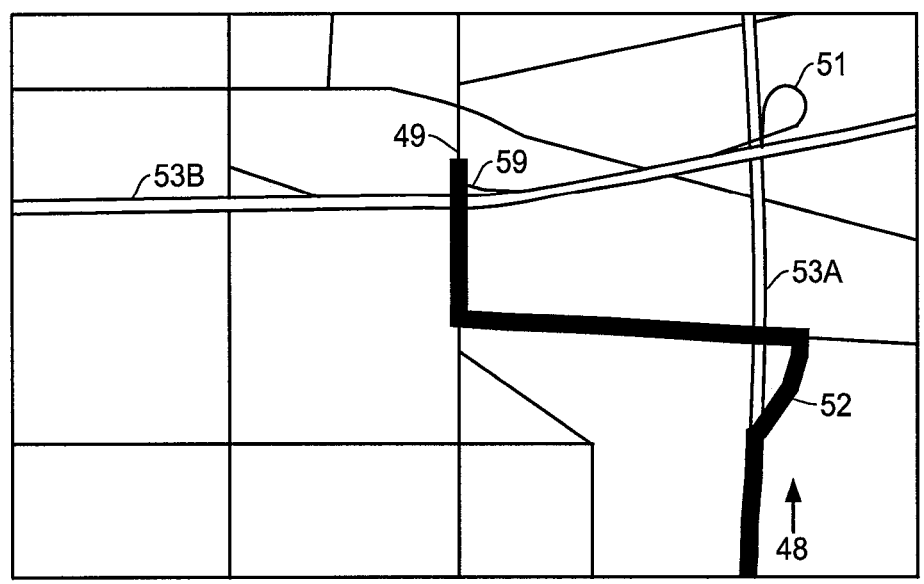

FIG. 4C is a map view showing a route to the destination calculated by a method proposed by the present invention for the same situation shown in FIG. 4A. Compared to the route obtained by the conventional route calculation shown in FIG. 4B, the route represented by thick line on the roads in FIG. 4C takes the ramp 52 to exit the first freeway 53A before encountering the freeway junction 51 and takes a surface street to the destination 49. Namely, the calculated route of FIG. 4C is able to avoid the freeway junction 51 and the second freeway 53B thereby obviating the stressful and difficult driving maneuvers such as quick lane changes, etc.

Figure 5:
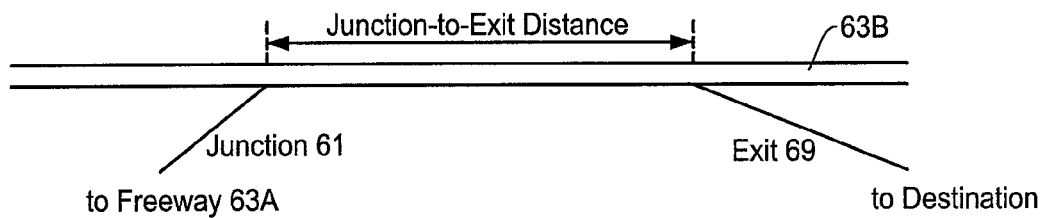
FIG. 5 is a schematic view for describing route calculation operations under the present invention to determine undesirable freeway junction situations based on a distance between an exit ramp and a freeway junction.

An example of method for determining whether the navigation system should perform route recalculation to avoid the freeway junction is described with reference to FIGS. 5 and 6A. The schematic view of FIG. 5 shows a freeway 63B, a junction 61 connecting the freeway 63B and a freeway 63A (not shown) and an exit 69 connected to the freeway 63B to reach the destination, i.e., the last exit from the freeway 63B. The exit 69 corresponds to the exit ramp 59 shown in FIGS. 4A to 4C, and the junction 61 corresponds to the freeway junction 51 shown in FIGS. 4A to 4C. The flow chart of FIG. 6A shows the operational steps of determining if the navigation system should perform route recalculation to avoid the freeway junction.

Figure 6A:
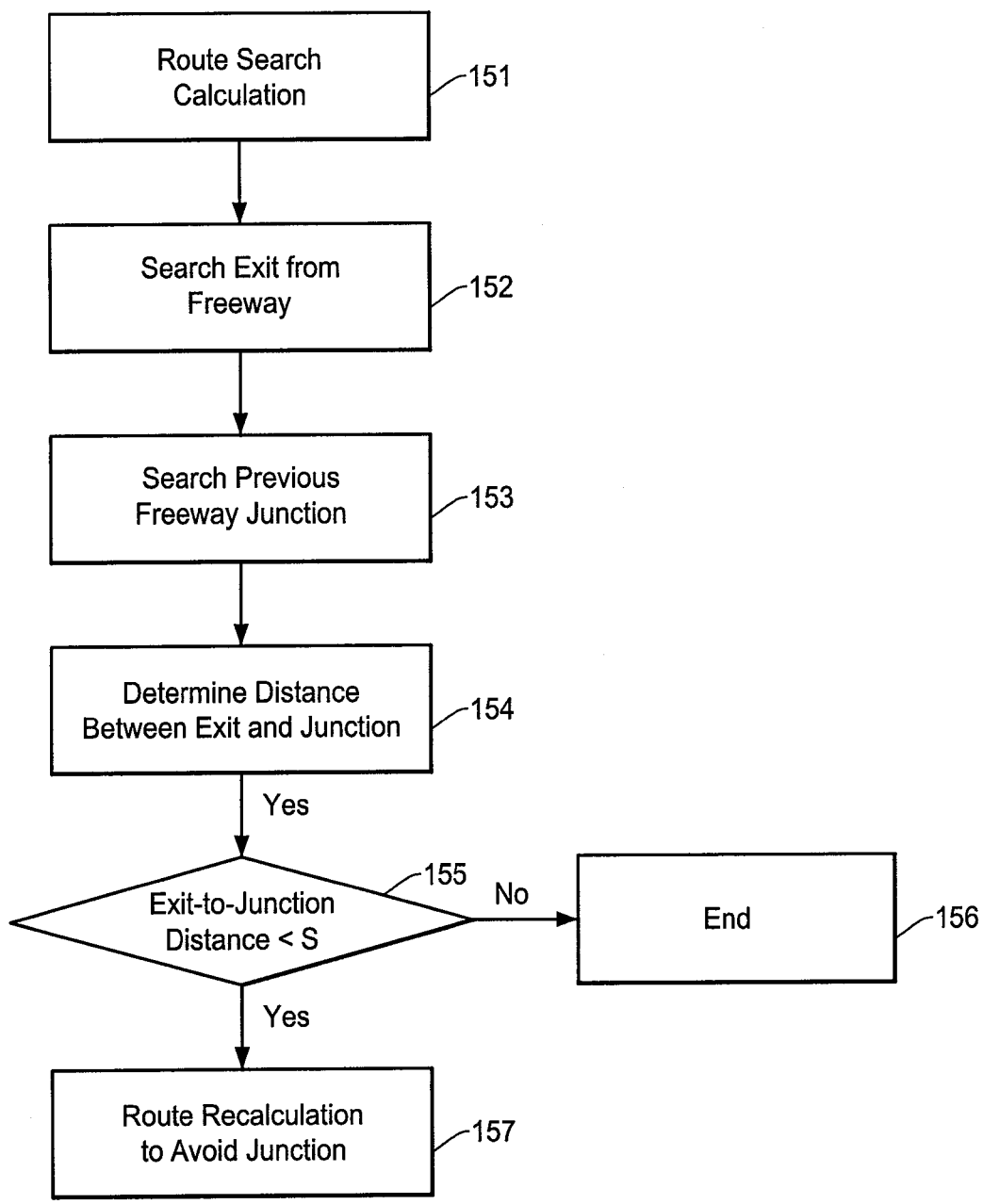
FIGS. 6A and 6B are flow charts showing operational steps of route calculation under the present invention to determine whether a particular freeway junction should be avoided, where

Referring to FIG. 6A, in step 151, the navigation system calculates a route from a start point to a destination. In step 152, the navigation system determines whether an exit (ramp) from a freeway is involved in the calculated route. This determination of whether an exit from a freeway is involved can be made by checking a road's attribute in the map data for each link in the calculated route. If the attribute shows a freeway ramp followed by a surface road, the navigation system determines that an exit from a freeway is involved in the calculated route.

When the exit from the freeway is involved, the navigation system further checks the calculated route and determines whether a freeway junction is involved before exiting the freeway. Specifically, the navigation system will read the link data of the calculated route stored in the map database or other memory device by traversing the calculated route, and checks the link type of each link data. If the link type is a freeway junction, the navigation system determines that a freeway junction is involved in the calculated route.

If a freeway junction is involved in the calculated route, the navigation system determines a distance from the freeway exit (last exit leading to the destination) to the freeway junction in step 154. Referring to the schematic view of FIG. 5, the distance between the junction and the exit is defined as a "junction-to-exit distance" on the freeway 63B. Since the driver is changing the freeway via the freeway junction 61 from the first freeway 63A to the second freeway 63B and exiting the second freeway via the exit 69 in FIG. 5, the "junction-to-exit distance" represents a degree of difficulty and promptness of the driving maneuvers involved in this situation.

In step 155, the navigation system compares the junction-to-exit distance determined in step 154 with a predetermined threshold distance S. The predetermined distance S is set so as to avoid maneuvers needed to drive a short distance between the freeway junction and the exit of the freeway. For example, the predetermined threshold distance M is set to 0.5 mile although the predetermined distance S can be any distance that is appropriate for detection of prompt maneuvers to exit from a freeway after a freeway junction.

When the junction-to-exit distance is less than the predetermined distance S, since this means that the calculated route of step 151 involves prompt and stressful maneuvers, the process moves to step 157 where the navigation system recalculates a route that avoids the freeway junction. On the other hand, if the junction-to-exit distance is greater than the predetermined distance S, this means that the calculated route of step 151 involves a sufficient time for maneuvers to exit from the freeway. Thus, the process moves to step 156 where the navigation system terminates so that the calculated route of step 151 is treated as a final one for the route guidance by the navigation system.

Figure 8:
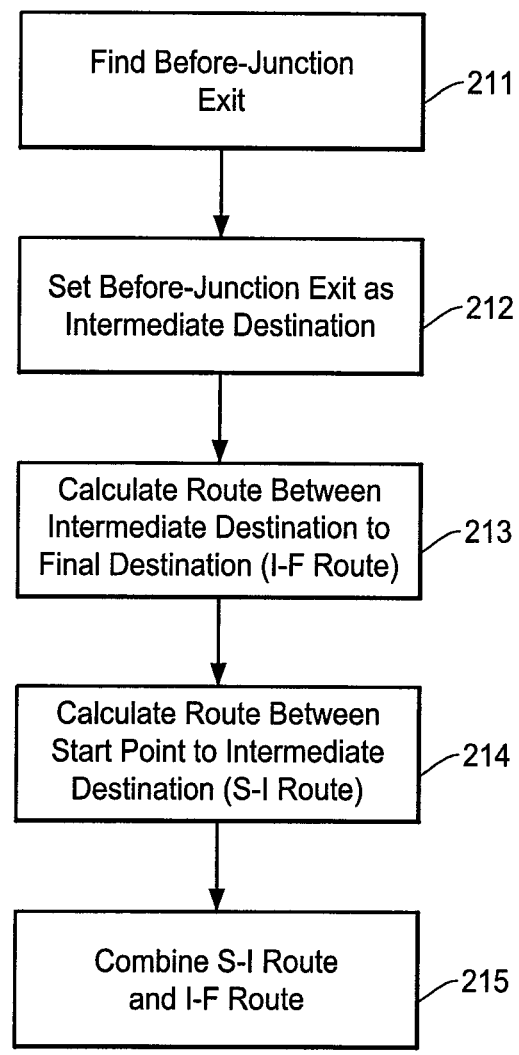
FIG. 8 is a flow chart showing detailed steps of a sub-routine indicated by step 157 of FIG. 6A for recalculating a route after an undesired freeway junction has been identified immediately before exiting from a freeway.

The flow chart of FIG. 8 shows detailed procedures of step 157 shown in FIG. 6A where the navigation system recalculates a route that avoids the freeway junction. In step 211, the navigation system checks the originally calculated route (step 151 of FIG. 6A) to find a before-junction exit. The before-junction exit is an exit from a first freeway that is immediately before the freeway junction. In the example shown in FIGS. 4A to 4C, the ramp 52 connected to the first freeway 53A is the before-junction exit since this ramp 52 is the last exit of the freeway 63A before the freeway junction 51.

In step 212, the before-junction exit is set as an intermediate destination in the navigation system. The intermediate destination may be set in the navigation system by selecting the link for the ramp 52 (before-junction exit) from the map data. Alternatively, the intermediate destination may be set in the navigation system by selecting a node or vertex of the link for the ramp 52 (after-junction entry) from the map data.

In step 213, the navigation system performs a route calculation between the intermediate destination (I) to the final destination (F), which may also be referred to as "I-F route" hereafter. Any path finding algorithm may be utilized in calculating the route between the start point to the intermediate destination. Next, in step 214, the navigation system calculates the route between the start point (S) to the intermediate destination (I), which may also be referred to as "S-I route" hereafter. Finally, in step 215, the navigation system combines the I-F route and the S-I route to obtain an overall route from the start point to the final destination which can avoid the freeway junction and the freeway in a manner shown in FIG. 4C.

Figure 6B:
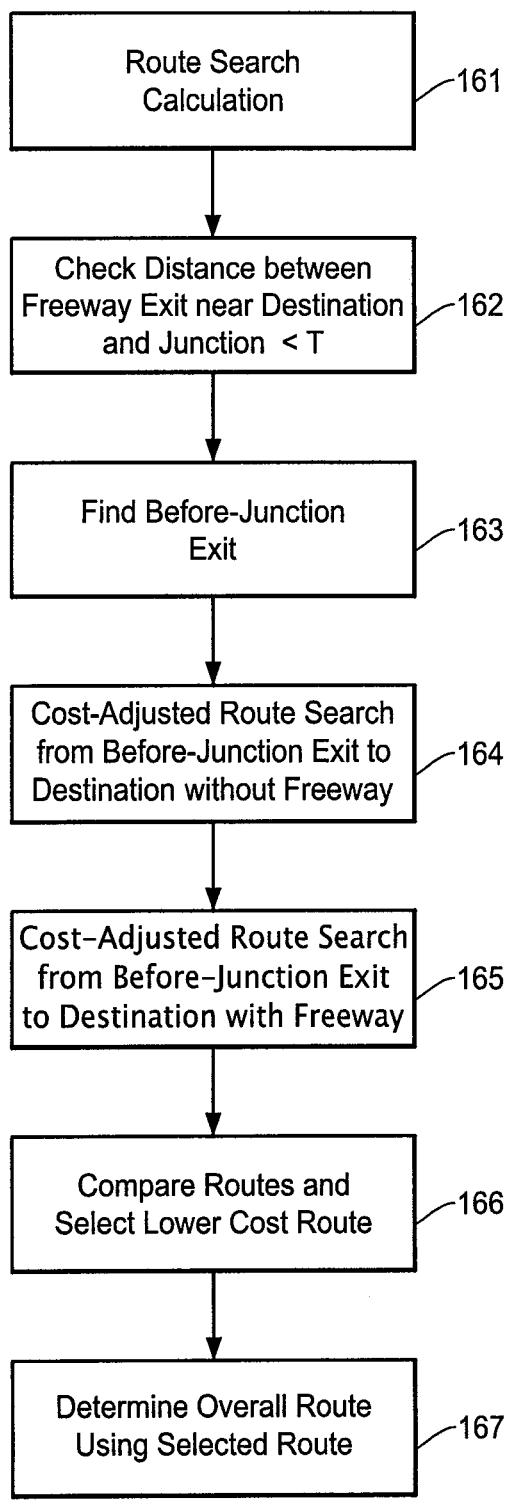

Still another method to calculate the route shown in FIG. 4C, which avoids the freeway junction 51 and thus the second freeway 53B, is described with reference to the flow chart of FIG. 6B. In step 161, the navigation system calculates a route from a start point to a destination which is the same process of step 151 in FIG. 6A. The start point may be a current position of the vehicle or an arbitrarily-set position entered by the user.

In step 162, the navigation system examines the calculated route and finds an exit of the freeway near the destination, which corresponds to the ramp 59 shown in FIGS. 4A-4C. Further, the navigation system finds a freeway junction that is taken before the exit in the route, which corresponds to the freeway junction 51 in FIGS. 4A-4C. The distance between the exit near the destination and the freeway junction is compared with a predetermined threshold distance T, which is an arbitrarily set distance to find if an immediate exit action after taking a freeway junction exists in the calculated route.

If the distance between the exit and the freeway junction is shorter than the predetermined distance T, the navigation system further determines if a before-junction exit exists in the calculated route in step 163. The before-junction exit is an exit from a freeway that comes right before the freeway junction, which corresponds to the exit ramp 52 in FIGS. 4A-4C. The navigation system may find the before-junction exit after completing the initial route search, or it may simultaneously search the before-junction exit as the initial route search is being performed.

In step 164, the navigation system performs a route search between the before-junction exit (ramp 52) to the destination 49 without using a freeway (second freeway 53B). In this process, the navigation system ignores the freeway links in determining the route. In step 165, the navigation system performs a route search between the before-junction exit (ramp 52) and the destination 49 using a freeway (second freeway 53B). In both steps 164 and 165, the navigation system disregards the cost relating to road type that is associated with the link of the route. In general, a freeway link is assigned a lower cost compared to a surface road link, thus a freeway is more likely selected in a calculated route because of its low cost. In steps 164 and 165, however, by equalizing the cost between the freeway link and the surface road link, the navigation system will not preferentially select a freeway in a calculated route.

In step 166, the route obtained in step 164 without allowing a freeway and the route obtained in step 165 allowing a freeway are compared, and the route with lower cost is selected. Since the cost of the freeway is the same as the cost of surface roads in the evaluation of step 165, the route found in step 164 tends to be lower in cost than the route found in step 165. This is because, to take a freeway, additional roads and ramps have to be typically included in the route, which increases an overall cost.

In step 167, the navigation system determines an overall route from the start point to the destination including the route selected in step 166. As noted above, the route selected in step 166 runs between the before-junction exit (ramp 52) and the destination 49 shown in FIG. 4C. Thus, in the process of step 167, the navigation system combines the previous route between the start point and the before-junction exit and the selected route between the before-junction exit and the destination, thereby establishing an overall route without an undesired freeway junction and freeway (junction 51 and freeway 53B in FIG. 4C).

As described above, the method of calculating a route involving a freeway junction of the present invention can determine an undesired freeway junction and recalculate an alternative route that does not have the undesired freeway junction. The navigation system may present both the conventional route such as shown in FIGS. 1B and 4B and the alternative route described above as shown in FIGS. 1C and 4C, and allow the user to select the route. In the present invention, it is not necessary to create a dedicated map data to perform the functions described above since the functions can be performed using existing map data.

FIG. 9 is a block diagram showing an example of structure of a vehicle navigation system for implementing the present invention of route calculation involving a freeway junction. While the vehicle navigation system is explained for an illustration purpose, the present invention can also be applied to other types of navigation system, such as a portable navigation device implemented by a PDA (personal digital assistant) device, other hand-held devices such as a smart phone, a laptop or notebook computer.

In the block diagram, the navigation system includes a data storage device 231 such as a hard disc, CD-ROM, DVD, memory device or other storage means (hereafter "data storage") for storing the map data. The navigation system includes a control unit 232 for controlling an operation for reading the information from the data storage device 231, and a position measuring device 233 for measuring the present vehicle position or user position. For example, the position measuring device 233 has a vehicle speed sensor for detecting a moving distance, a gyroscope for detecting a moving direction, a microprocessor for calculating a position, a GPS (Global Positioning System) receiver, and etc.

The block diagram of FIG. 9 further includes a map information memory 234 for storing the map information which is read from data storage device 231, a database memory 235 for storing database information such as point of interest (POI) information which is read out from the data storage device 231, an input device 237 for executing a menu selection operation, an enlarge/reduce operation, a start point input operation, a destination input operation, etc. and an input device interface 238. The input device 237 can be a touch screen or multi-touch device formed on a monitor (display) 250.

In FIG. 9, the navigation system further includes a bus 236 for interfacing the above units in the system, a processor (CPU) 239 for controlling an overall operation of the navigation system, a ROM 240 for storing various control programs such as a route search program and a map matching program necessary for navigation control, a RAM 241 for storing a processing result such as a guide route, a display controller 243 for generating map image on the basis of the map information, a VRAM 244 for storing images generated by the display controller 243, a menu/list generating unit 245 for generating menu image/various list images, a synthesizing unit 246, a wireless transmitter 249 for wireless communication to retrieve data such as traffic information from a remote server or wireless communication with a communication network such as Internet, a buffer memory 248 for temporally storing data for ease of data processing, and a monitor (display) 250.

The procedures described in the flow charts described above are performed by the CPU 239. Specifically, the CPU 239 is configured to execute programs that performs the procedures described in FIGS. 3A, 3B, 3C, 6A, 6B, 7 and 8 in the foregoing. The programs that perform the procedures described in FIGS. 3A, 3B, 3C, 6A, 6B, 7 and 8 may be stored in the data storage device 231 or the ROM 240. The data storage device 231 stores map data, including such features as location coordinates, shape, addresses, road class, speed range, etc. The CPU 239 reads a calculated route from the RAM 241 to determine whether a freeway junction is involved in the calculated route as described in reference to the flow charts above and recalculates the route to avoid a particular freeway junction as necessary.

As has been described above, according to the method and apparatus for calculating a route involving a freeway junction of the present invention, the navigation system can detect an undesired freeway junction and recalculate to create an alternative route that does not have the undesired freeway junction. The method and apparatus detects the undesired condition based on a number of entries to the freeway compared with a predetermined threshold number. Alternatively, the method and apparatus detects the undesired condition based on a distance between an entry to the freeway and the freeway junction with a predetermined threshold number. Similarly, the method and apparatus detects the undesired condition based on a distance between the freeway junction and an exit from the freeway with a predetermined threshold number. Consequently, the recalculated route is able to avoid the freeway junction, thereby relieving the driver from the stressful and difficult driving maneuvers such as quick lane changes, etc.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of route calculation for a navigation system, comprising the following steps of:

establishing, by using a processor, a calculated route between a start point and a destination by evaluating map data of a navigation system where the calculated route includes a freeway, wherein the start point is a current position detected by a position measuring device which includes a GPS receiver;

traversing the calculated route from the start point to detect whether there is a freeway junction, where the freeway junction is defined as a route to allow a vehicle to change from one freeway to another freeway;

examining the calculated route to detect a location of an entry to the freeway or an exit from the freeway proximate to the freeway junction;

further examining the calculated route to detect whether there is an undesired condition related to the freeway junction, entry to the freeway or exit from the freeway that may require prompt driving maneuvers of the vehicle by a driver; and recalculating, when the undesired condition is detected, a route between the start point and the destination so that the recalculated route avoids the freeway junction related to the undesired condition.

2. The method of route calculation as defined in claim 1, said step of examining the calculated route to detect the undesired condition is conducted by comparing a number of entries to the freeway with a predetermined threshold number where the number of entries to the freeway is counted between the first entry to the freeway and the freeway junction.

3. The method of route calculation as defined in claim 1, said step of examining the calculated route to detect the undesired condition is conducted by comparing a distance between a first entry to the freeway and the freeway junction with a predetermined threshold distance.

4. The method of route calculation as defined in claim 1, said step of examining the calculated route to detect the undesired condition is conducted by comparing a distance between a last exit from the freeway and the freeway junction with a predetermined threshold distance.

5. The method of route calculation as defined in claim 1, when a part of the calculated route runs from an entry to a first freeway, and to a second freeway via the freeway junction, said step of recalculating a route between the start point and the destination includes the following steps of:
   detecting, by examining the map data, an entry to the second freeway that comes first after passing the freeway junction;
   setting the detected entry as an intermediate destination to the navigation system;
   calculating a first route between the start point and the intermediate destination;
   calculating a second route between the intermediate destination and a final destination; and
   combining the first route and the second route, thereby creating an overall route between the start point and the final destination.

6. The method of route calculation as defined in claim 1, when a part of the calculated route runs from a first freeway to a second freeway via the freeway junction and to an exit from the second freeway, said step of recalculating a route between the start point and the destination includes the following steps of:
   detecting, by examining the map data, an exit from the first freeway that comes immediately before the freeway junction;
   setting the detected exit as an intermediate destination to the navigation system;
   calculating a first route between the start point and the intermediate destination;
   calculating a second route between the intermediate destination and a final destination; and
   combining the first route and the second route, thereby creating an overall route between the start point and the final destination.

7. The method of route calculation as defined in claim 1, when a part of the calculated route runs from an entry to a first freeway, and to a second freeway via the freeway junction, said step of recalculating a route between the start point and the destination includes the following steps of:
   detecting, by examining the map data, an entry to the second freeway that comes first after passing the freeway junction;
   setting the detected entry as an intermediate destination to the navigation system;
   calculating a first route between the start point and the intermediate destination without freeways and without assigning costs to difference of road class;
   calculating a second route between the start point and the intermediate destination including freeways and without assigning costs to difference of road class; and
   comparing an overall cost of the first route and an overall cost of the second route and selecting the route of lower cost.

8. The method of route calculation as defined in claim 7, further comprising a step of combining the selected route with a remaining route between the entry to the second freeway and the final destination established in the route originally calculated, thereby creating an overall route between the start point and the final destination.

9. The method of route calculation as defined in claim 1, when a part of the calculated route runs from a first freeway to a second freeway via the freeway junction and to an exit from the second freeway, said step of recalculating a route between the start point and the destination includes the following steps of:
   detecting, by examining the map data, an exit from the first freeway that comes immediately before the freeway junction;
   setting the detected exit as an intermediate destination to the navigation system;
   calculating a first route between the intermediate destination and a final designation without freeways and without assigning costs to difference of road class;
   calculating a second route between the intermediate destination and the final destination including freeways and without assigning costs to difference of road class; and
   comparing an overall cost of the first route and an overall cost of the second route and selecting the route of lower cost.

10. The method of route calculation as defined in claim 9, further comprising a step of combining the selected route with a remaining route between the start point to the exit from the first freeway established in the route originally calculated, thereby creating an overall route between the start point and the final destination.

11. An apparatus of route calculation for a navigation system, comprising:
   a display configured to display thereon information concerning operations of navigation system;
   a storage device configured to store map data and programs for operations of navigation system;
   an input device configured to accept a user's input including a start point and a destination for the navigation system; and
   a central processing unit configured, by executing the programs in the storage device, to conduct the following operations of:
      establishing a calculated route between a start point and a destination by evaluating map data of a navigation system where the calculated route includes a freeway, and wherein the start point is a current position detected by a position measuring device which includes a GPS receiver;
      traversing the calculated route from the start point to detect whether there is a freeway junction, where the freeway junction is defined as a route to allow a vehicle to change from one freeway to another freeway;

examining the calculated route to detect a location of an entry to the freeway or an exit from the freeway proximate to the freeway junction;

further examining the calculated route to detect whether there is an undesired condition related to the freeway junction, entry to the freeway or exit from the freeway that may require prompt driving maneuvers of the vehicle by a driver; and recalculating, when the undesired condition is detected, a route between the start point and the destination so that the recalculated route avoids the freeway junction related to the undesired condition.

12. The apparatus of route calculation as defined in claim 11, wherein the central processing unit is further configured to conduct an operation of examining the calculated route to detect the undesired condition by comparing a number of entries to the freeway with a predetermined threshold number where the number of entries to the freeway is counted between the first entry to the freeway and the freeway junction.

13. The apparatus of route calculation as defined in claim 11, wherein the central processing unit is further configured to conduct an operation of examining the calculated route to detect the undesired condition by comparing a distance between a first entry to the freeway and the freeway junction with a predetermined threshold distance.

14. The apparatus of route calculation as defined in claim 11, wherein the central processing unit is further configured to conduct an operation of examining the calculated route to detect the undesired condition by comparing a distance between a last exit from the freeway and the freeway junction with a predetermined threshold distance.

15. The apparatus of route calculation as defined in claim 11, wherein, when a part of the calculated route runs from an entry to a first freeway, and to a second freeway via the freeway junction, the central processing unit is further configured to conduct an operation of recalculating a route between the start point and the destination by performing the operations of:

detecting, by examining the map data, an entry to the second freeway that comes first after passing the freeway junction;

setting the detected entry as an intermediate destination to the navigation system;

calculating a first route between the start point and the intermediate destination;

calculating a second route between the intermediate destination and a final destination; and combining the first route and the second route, thereby creating an overall route between the start point and the final destination.

16. The apparatus of route calculation as defined in claim 11, wherein, when a part of the calculated route runs from a first freeway to a second freeway via the freeway junction and to an exit from the second freeway, the central processing unit is further configured to conduct an operation of recalculating a route between the start point and the destination by performing the operations of:

detecting, by examining the map data, an exit from the first freeway that comes immediately before the freeway junction;

setting the detected exit as an intermediate destination to the navigation system;

calculating a first route between the start point and the intermediate destination; calculating a second route between the intermediate destination and a final destination; and combining the first route and the second route, thereby creating an overall route between the start point and the final destination.

17. The apparatus of route calculation as defined in claim 11, wherein, when a part of the calculated route runs from an entry to a first freeway, and to a second freeway via the freeway junction, the central processing unit is further configured to conduct an operation of recalculating a route between the start point and the destination by performing the operations of:

detecting, by examining the map data, an entry to the second freeway that comes first after passing the freeway junction;

setting the detected entry as an intermediate destination to the navigation system; calculating a first route between the start point and the intermediate destination without freeways and without assigning costs to difference of road class;

calculating a second route between the start point and the intermediate destination including freeways and without assigning costs to difference of road class; and comparing an overall cost of the first route and an overall cost of the second route and selecting the route of lower cost.

18. The apparatus of route calculation as defined in claim 17, wherein the central processing unit is further configured to conduct an operation of combining the selected route with a remaining route between the entry to the second freeway and the final destination established in the route originally calculated, thereby creating an overall route between the start point and the final destination.

19. The apparatus of route calculation as defined in claim 11, wherein, when a part of the calculated route runs from a first freeway to a second freeway via the freeway junction and to an exit from the second freeway, the central processing unit is further configured to conduct an operation of recalculating a route between the start point and the destination by performing the operations of:

detecting, by examining the map data, an exit from the first freeway that comes immediately before the freeway junction;

setting the detected exit as an intermediate destination to the navigation system;

calculating a first route between the intermediate destination and a final designation without freeways and without assigning costs to difference of road class;

calculating a second route between the intermediate destination and the final destination including freeways and without assigning costs to difference of road class; and comparing an overall cost of the first route and an overall cost of the second route and selecting the route of lower cost.

20. The apparatus of route calculation as defined in claim 19, wherein the central processing unit is further configured to conduct an operation of combining the selected route with a remaining route between the start point to the exit from the first freeway established in the route originally calculated, thereby creating an overall route between the start point and the final destination.

* * * * *